(12) United States Patent
Meyer et al.

(10) Patent No.: US 6,792,037 B2
(45) Date of Patent: Sep. 14, 2004

(54) APPARATUS AND METHOD OF SEARCHING FOR KNOWN SEQUENCES

(75) Inventors: Jan Meyer, Weilheim (DE); Peter Bohnhoff, Munich (DE); John David Kaewell, Jr., Jamison, PA (US); Alexander Reznik, Princeton, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/322,184

(22) Filed: Dec. 18, 2002

(65) Prior Publication Data

US 2003/0161416 A1 Aug. 28, 2003

Related U.S. Application Data

(60) Provisional application No. 60/360,822, filed on Feb. 28, 2002.

(51) Int. Cl.$^7$ .................................................. H04L 7/00
(52) U.S. Cl. .................... 375/150; 375/152; 375/368
(58) Field of Search ................................. 375/142, 143, 375/150, 152, 343, 362, 368; 370/342, 497

(56) References Cited

U.S. PATENT DOCUMENTS

| | | | |
|---|---|---|---|
| 5,428,647 A | * | 6/1995 | Rasky et al. ................ 375/366 |
| 5,982,763 A | | 11/1999 | Sato |
| 6,049,576 A | * | 4/2000 | Magill ........................ 375/365 |
| 6,181,733 B1 | | 1/2001 | Shinde |
| 2002/0196873 A1 | | 12/2002 | Peon et al. |
| 2003/0069911 A1 | | 4/2003 | Piirainen |

* cited by examiner

Primary Examiner—Amanda T. Le
(74) Attorney, Agent, or Firm—Volpe and Koenig, P.C.

(57) ABSTRACT

Apparatus and method for correlating a received communication of a known sequence over a wireless channel through the use of a finite impulse response (FIR) filter having a small number of taps to reduce hardware requirement by as much as one-half that of conventional techniques while obtaining amplitude degradation which is no worse than experienced when employing conventional techniques.

6 Claims, 3 Drawing Sheets

APPARATUS AND METHOD OF SEARCHING FOR KNOWN SEQUENCES

CROSS REFERENCE TO RELATED APPLICATION

This application claims priority from U.S. provisional application No. 60/360,822 filed on Feb. 28, 2002, which is incorporated by reference as if fully set forth.

FIELD OF THE INVENTION

The present invention relates to the required timing resolution versus performance loss encountered when performing a search for a known transmitted signal sequence in a receiver by correlation. The search is performed in a $3^{rd}$ generation partnership project (3GPP) wideband code division multiple access (WCDMA) receiver during a propagation path search or random access channel (RACH) preamble detection.

BACKGROUND

The description of the invention focuses primarily on the frequency division duplex (FDD) version of a communication system. The invention, however, is applicable to almost all known sequence search in any communication system to search a known sent sequence in a received signal in the time domain.

There are several purposes why a sequence of symbols known to the receiver might be sent out from a transmitter such as channel estimation with respect to timing delay, amplitude and phase such as in a path search; signaling for (slotted) ALOHA multiple access collision detection and access granting such as with RACH preamble detection; and signaling of timing relations and even code group allocations, such as in a cell search.

Particularly in cases where lower level signaling is involved, there are usually several different known sequences that possibly can be sent out, and the signaling value is dependent on which one is found. Therefore, the search has to be performed over all available possible, or relevant, sequences. The present invention is applicable whether one sequence is searched for at a time or whether several different searches for different single sequences are performed in parallel or serially.

The exact receive timing of a known sequence is often not known. Unfortunately, this is exactly the parameter of interest, (e.g., for RACH preamble, if the distance and therefore the propagation latency between transmitter and receiver are not known). Additionally, the transmit timing could be completely unknown, such as in cell searching; or the reception of the known sequence could be in different replicas with respect to timing, amplitude and phase, but these parameters would then be of particular interest, such as in path searching.

In general, there is a certain time window when the sequence is expected to be received, which is constituted by some transmit timing relationship, (or simply the repetition rate if the sequence is repeatedly sent out on a regular basis). Therefore, on the receive side, a search for the sequence is made within the time window, typically by repeated correlation of the incoming received signal at consecutive instances in time followed by a search of maxima or threshold comparison in the output signal of this correlator. This operation of correlation at consecutive time instances can be viewed as finite impulse response (FIR) filtering of the incoming signal using the expected sequence as the coefficients for the FIR filter. This is in line with the idea of using a matched filter for detection.

In a 3GPP system, the known sequences of symbols are transmitted using a pulse shaping filter of the root-raised-cosine (RRC) type. On the receiver side, an RRC-type filter matched to this transmit pulse is used. The combination of both filters, (in time domain the convolution), is then of the raised-cosine (RC) type. FIG. 1 shows the impulse response of an RC filter in time domain, with a filter roll-off factor of 0.22 as used in 3GPP, and being normalized to 1.0 as the maximum amplitude. Amplitude magnitude in dB of the impulse response for the filter of FIG. 1, is shown in FIG. 2.

Obviously, if the transmit and receive timing for a symbol are fully aligned, the received signal amplitude is at maximum and for neighboring symbols spaced at integer multiples of the symbol duration Tc, the received signal is zero. This is one of the essential properties of these types of filters and is the reason why this type of filter is used in this application.

If the exact symbol timing is not known, and the reception is off by some timing offset, then the received signal amplitude is not at maximum any more. With the search of a known sequence with unknown timing, the exact symbol timing will typically not be met. Accordingly, this type of error almost always occurs.

If the search for a known sequence is performed spaced in time at Tc, then the maximum possible timing error is Tc/2, and the amplitude degradation resulting from this, as shown in FIG. 2, is about 4 dB, which is prohibitive for performance reasons. For a sequence search performed spaced at Tc/2, the maximum timing error is Tc/4, and the amplitude degradation 0.94 dB.

In view of the above, performing the full correlations at a rate of Tc/2 is the approach most widely seen in current approaches to the challenge of a known sequence search with unknown timing. However, this approach is not optimum with respect to the processing effort. The problem of performance degradation caused by timing mismatch has been solved in the prior art through the use of a simple over-sampling approach conducted at the start of the baseband processing chain. This approach requires a significant amount of additional hardware as compared with processing that does not employ over-sampling.

The present invention makes it possible to perform highly hardware demanding chip rate processing on a single-sample-per-chip rate as opposed to an over-sampled rate.

In order to cope with the possibility of a timing error, the present invention employs an FIR filter structure as an estimation filter which estimates those samples that have been skipped in the chip rate processing. Since the processing is performed on a symbol level and also since the FIR filter is very short with respect to its coefficient number, the additional hardware required is significantly lower than that required for performing over-sampling at the chip rate. The degradation of the detection performance is marginal to negligible even when employing FIR filter structures with a low number of taps, such filter structures being of simple design and are quite inexpensive to implement.

Thus, the present invention reduces the processing costs of the correlation process by close to 50% while at the same time achieving similar performance and at a reduced cost of the necessary hardware as compared with present day over-sampling techniques employed to deal with timing mismatch.

DETAILED DESCRIPTION OF THE PREFERRED EMBODIMENTS

Figure 1:
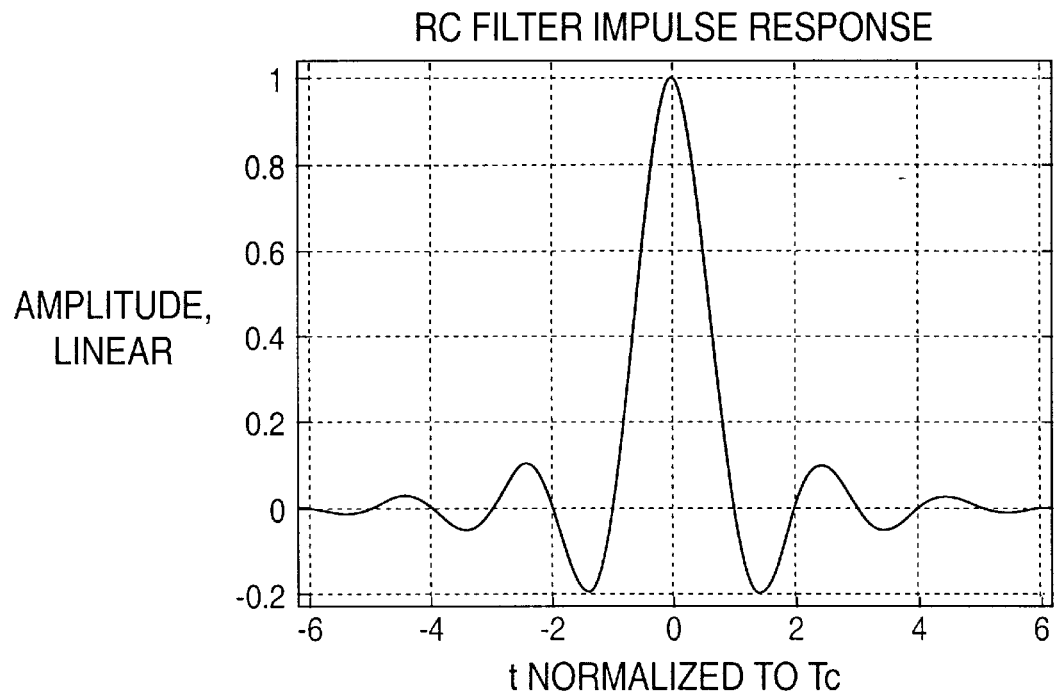
FIG. 1 is the impulse response in time domain of an RC filter with a roll-off factor of 0.22.
Figure 2:
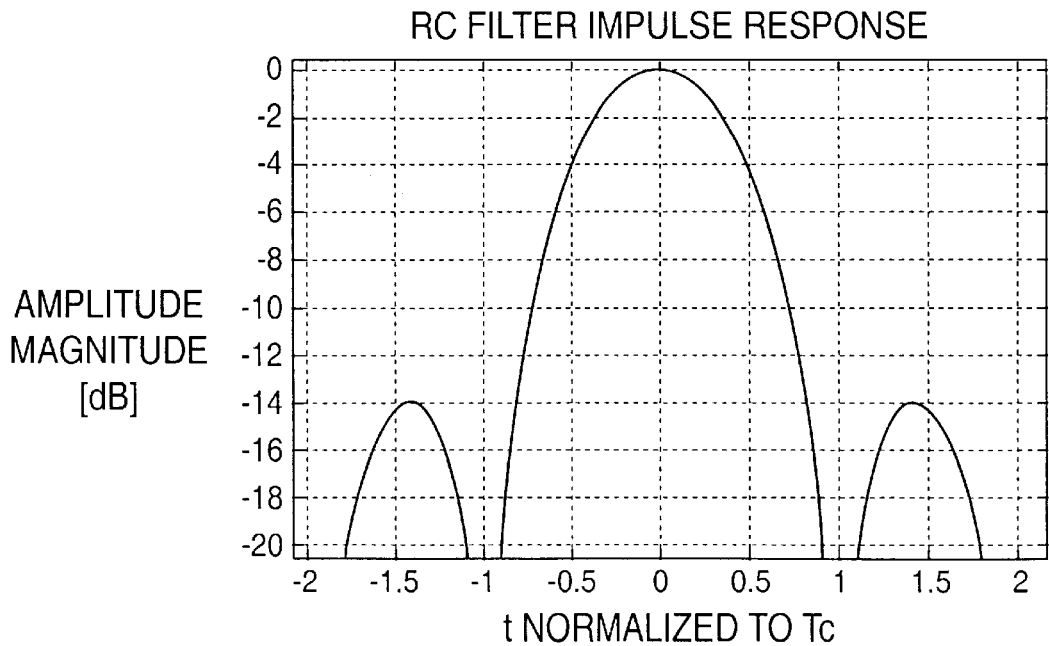
FIG. 2 is the amplitude magnitudes in dB of the filter of FIG. 1.

The present invention will be described with reference to the drawing figures where like numerals represent like elements throughout.

In the Background Section it was noted that in the search for a known sequence, when performing the correlation off time, the resulting amplitude can be read out of the RC pulse, dependent on the timing lag. It is assumed that the known sequence has the desired property of having an autocorrelation function of a single dirac pulse, which is only an approximation. In reality, this autocorrelation has sidelobes as well, depending on the exact known sequence/scrambling code for which a precise evaluation would need to be taken into account, but may be neglected herein for simplicity.

Therefore, if correlations against the known sequence spaced in time from each other (e.g., at Tc) are performed, then a sampled replica of the RC pulse can be seen in the sequence of these correlation results.

In the rare event of exact on-time correlation, this would be at the maximum, and no sidelobes would be visible. In the general case, where some timing offset is present, one maximum will be observed and, in the neighboring correlation results, the positive and negative sidelobes sampled at Tc according to the RC pulse will be observed.

Since it is desired that the correlation results are calculated at a rate of 1/Tc, but it is desired to avoid suffering a 4 dB loss in the case of a timing offset of Tc/2, the present invention attempts to estimate the missing but desired correlation result values at an additional timing offset of Tc/2 against the available ones by collecting and constructively combining the sidelobes together. In this manner, positive sidelobes will be combined with a positive weight and negative sidelobes combined with negative weight.

In order to derive the weights more exactly, strong sidelobes can be used to amplify, and weak sidelobes to attenuate, as with maximum ratio combining theory, (i.e., a matched filter). In the replica of the correlation results, which is of the sampled RC type, a FIR filter matched to this signal is applied, which is then also a sampled RC type of filter.

For the on-time case and sampling with 1/Tc, the impulse response of the FIR filter is a single dirac pulse, so no further action is necessary. For the Tc/2 shifted case and sampling with 1/Tc, the FIR filter is the RC time pulse sampled at the time instances of Tc=N+½, N being all integer numbers.

The present invention applies, in addition to a matched filter matched to a known sequence, which is the correlation filter, a matched filter matched to the whole known transmission filter chain, which is an RC filter. This filter, with coefficients like the RC pulse sampled at time instances of Tc=N+½, N being all integer numbers, is infinite in length and therefore truncation is needed. Assuming truncation of the filter to a length of 4 coefficients $a_0 \ldots a_3$, wherein $a_0=a_3=RC(t=1.5)=-0.1914$ and $a_1=a_2=RC(t=0.5)=0.6294$, (t being normalized to Tc). If computed correlation results cr(t) are available at some lags t=0, 1, 2, 3, a good estimate of cr(1.5) can be made using just a 4-tap FIR filter over the available correlation results:

$$cr(1.5) = \sum_{n=0}^{3} a_n cr(n) \qquad \text{Equation (1)}$$

Using this approach it can be estimated from any four surrounding correlation results the value of the desired central, not available (because of non-integer but integer+½ Tc timing offset) but desired correlation results to reduce the timing error and resulting amplitude attenuation.

Since the filter length is truncated, it is an estimation, not an exact calculation. Also, since the RC pulse has a single-sided frequency bandwidth larger than 1/(2*Tc), but less than 1.22/(2*Tc), more loss results from the fact that it is undersampled using 1/Tc as the sample rate. Additionally, the bandwidth of the estimation filter used is smaller than 1/(2*Tc). It should be noted that an example where it would be desired to extend the resolution from 2/Tc to 4/Tc, the bandwidth issues would not be relevant. However, since this is not the preferred embodiment application, sampling the RC pulse at 1/Tc rate (i.e., performing the initial correlation at 1/Tc rate, then estimating the remaining values to get to the 2/Tc rate) is performed in the present invention.

Additionally, for the purpose of a sequence search, it is not a requirement to maintain the essential property of the RC type overall pulse shaping filter chain (non-intersymbol interference (ISI)) by zero-crossings at N times Tc for N other than zero). Rather, is it important in this application to achieve high peaks for all timing offsets, such that the peak detection performance is, as far as possible, independent of the quasi-random timing offset.

As hereinbefore discussed, the present invention preferably utilizes a 4-tap FIR filter applied on available computed correlation results at time instances spaced at 1/Tc, to estimate intermediate correlation values and thereby increase the timing resolution of the correlation results to 2/Tc. Any consecutive processing, such as threshold comparison or maximum search, is then applied to these correlation results available at rate of 2/Tc, just as if they had been computed by brute-force full correlation at rate 2/Tc.

Figure 5:
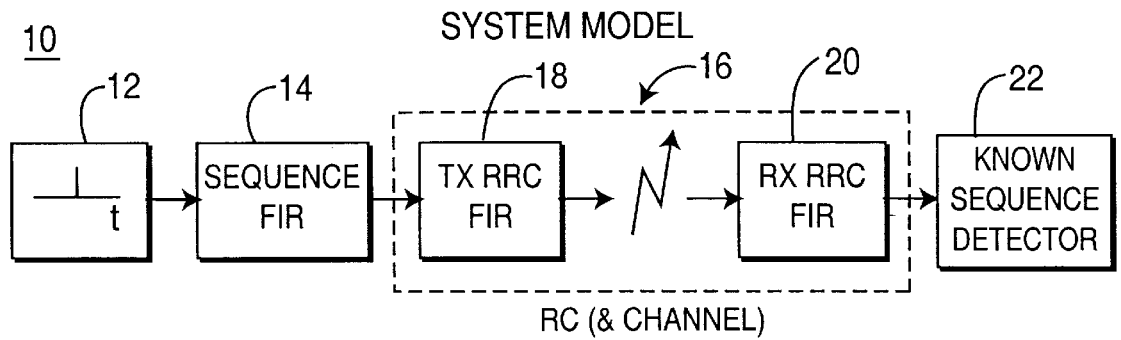
FIG. 5 is a block diagram of a system for achieving timing synchronization.

FIG. 5 shows a system model 10 in which a dirac pulse 12 is applied to a sequence FIR filter 14 which is applied to a root-raised cosine (RRC) FIR filter 18 forming part of the channel 16. At the receiver end, a root-raised-cosine (RRC) FIR filter 20 receives the transmitted signal, filter 20 being matched to the transmit pulse. The combination of the filters 18 and 20, function as a raised-cosine (RC) type filter. A novel aspect of the present invention is the utilization of the known sequence detector 22 in the signal processing chain. After the interpolation, the post-processing, e.g., maximum search or threshold detection is performed at stage 22 in much the same manner as conventional apparatus. Omission of an FIR filter structure from the signal processing chain would result in a search for the known sequence by correlation to either suffer from severe performance degradation or would require the already major chip rate processing complexity to be doubled.

Figure 6:
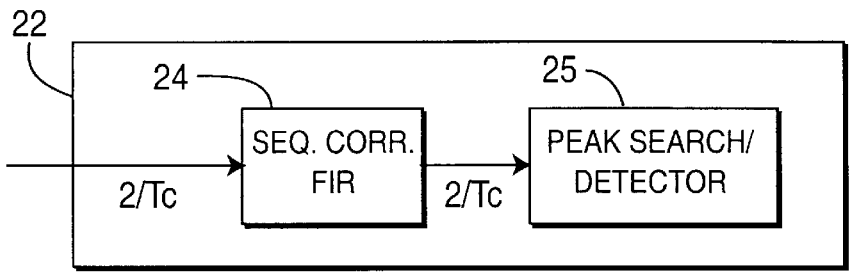
FIG. 6 is a block diagram useful in explaining the "brute force" technique presently being employed.

FIG. 6 shows the "brute force" method wherein the known sequence detector 22 includes a correlator finite impulse response (FIR) filter 24, which receives the incoming signal at the rate of two samples per chip and provides its output to the peak search detector 25, likewise operating at the rate of two samples per chip.

Figure 7:
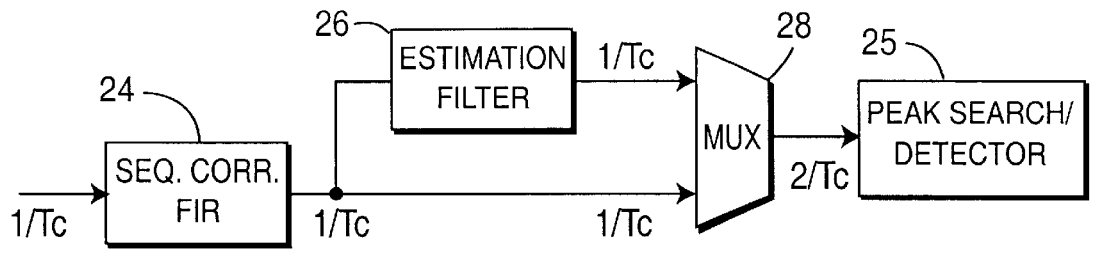
FIG. 7 is a block diagram useful in explaining the technique of the present invention.

By comparison, the novel method of the present invention, shown in FIG. 7, provides the incoming signal to the sequence correlator FIR filter 24 at the rate of one sample per chip. Its output, also at one sample per chip, is directly applied to multiplexer 28 as well as an estimation filter 26, which, in the preferred embodiment, is a four (4)-tap FIR filter.

The signal is applied to FIR filter 24 at the rate of one sample per chip and its output, likewise, at the one sample per chip rate, is processed by the estimation FIR filter 26.

Multiplexer 28 receives the two signal streams and alternates passage of these streams to the peak search/detector 25 which performs the peak search/detection operation at a rate of two samples per chip.

An estimate of the performance of 4-tap FIR filtering for the application is set forth below. Since the proposed coefficients for the filter are taken as the sampled RC pulse itself, for an on-time (i.e. in this case 3 Tc/2 off the 1/Tc sampling) signal into the filter (assuming a 1.0 peak amplitude), the signal per tap to be multiplied with an associated coefficient, is identical to the coefficient:

$$cr(n)=RC(n-1.5) \quad \text{Equation (2)}$$

The interpolation filter can be considered as a matched filter matched to the raised-cosine (RC) pulse. Since this pulse is infinite, an ideal filter would also be infinite. By restricting the filter to four (4) taps, further optimization of the coefficients using well known methods, like minimizing the mean square error, are possible. However, the gained improvements are not higher than 0.1 dB detection sensitivity.

Using Equation (2) in Equation (1) and the coefficients set forth above, Equation (1), cr(1.5) is estimated as:

$$cr'(1.5) = \sum_{n=0}^{3} (a_n)^2 \quad \text{Equation (3)}$$

In this case, cr'(1.5)=0.8656 is the estimation of the peak at t=1.5, estimated from out of the cr(t) for t=0 . . . 3 (i.e. the 4 surrounding ones). This is a loss of −1.25 dB=20 log (0.8656) for the peak of the estimation. The result of Equation (3) represents the energy scaling that the filter would apply to a white noise signal at it's input. This means that white noise at the input of the filter is attenuated by −0.63 dB=10 log(0.8656) to the output.

Since it is desired to obtain a peak for the estimation that is attenuated as little as possible, and at the same time to prevent white noise from being either amplified or attenuated, the whole coefficient set of the FIR filter is scaled by 1/sqrt(cr'(1.5))=1/sqrt(0.8656)=1.0749. The new coefficient set is then $b_0=b_3$=RC(t=1.5)/sqrt(cr'(1.5))=−0.2057 and $b_1=b_2$=RC(t=0.5)/sqrt(cr'(0.5))=0.6765.

This filter design will not change the energy of a white noise signal when passed through the filter. The estimation result with the new scaled filter coefficients, however, will only achieve a value of cr"(1.5)=sqrt(0.8656)=0.9304. The remaining attenuation on the peak is now reduced to −0.63 dB=20 log(sqrt(0.8656)). Accordingly, this attenuation of −0.63 dB is equal to the degradation in signal-to-noise ratio (SNR) at the peak.

Figure 3:
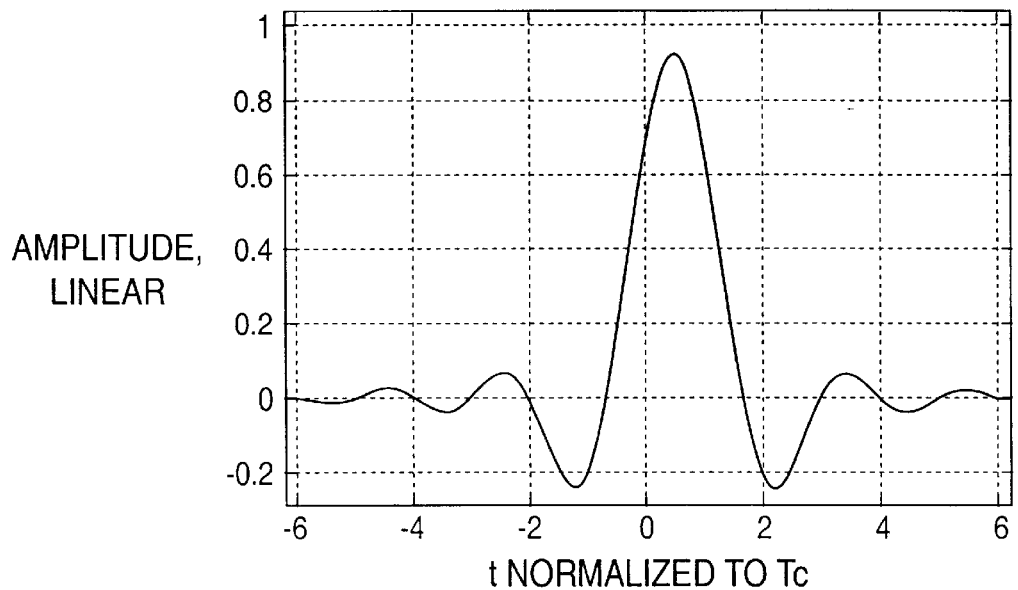
FIG. 3 is the convolution of the RC pulse with the filter of the present invention.

It has been demonstrated how much the attenuation is for the newly scaled estimation filter of the present invention if the true timing offset from the one correlated at 1/Tc is equal to Tc/2. This case is quite rare, and in general, the timing offset is different and quasi-random. Accordingly, a consideration of the impact of a different timing offset on the filter estimation method of the present invention will now be given. This is possible if the convolution of the RC pulse with the filter is observed. The result is shown in FIG. 3.

Figure 4:
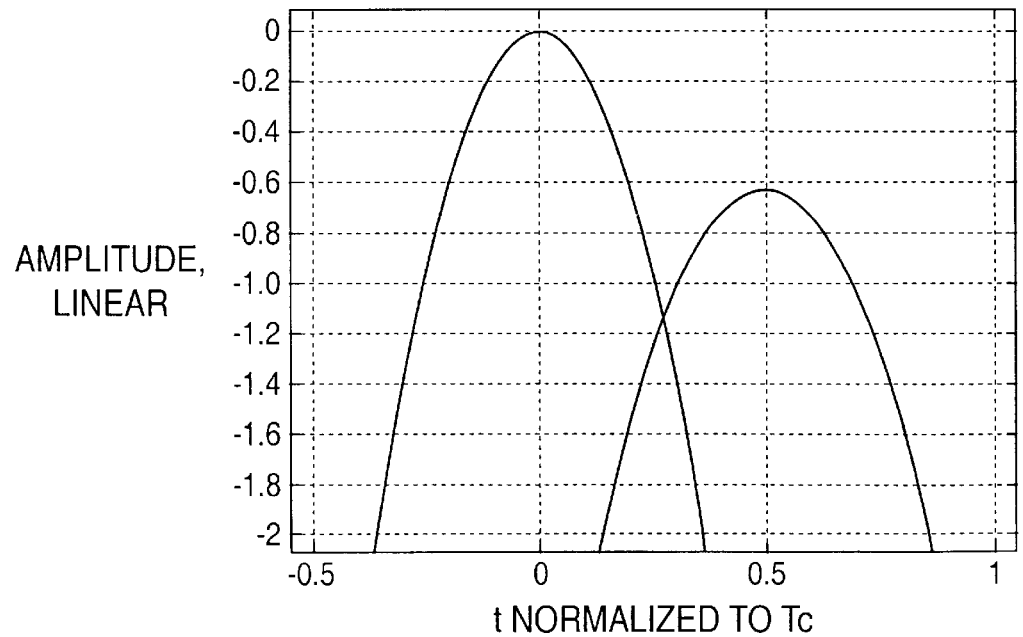
FIG. 4 is a comparison of the amplitude magnitudes in dB of the overall maximum attenuation of the present inventive method with the original correlation results and the estimated correlation results.

The difference between the amplitude magnitudes in dB of the overall maximum attenuation of the present inventive method with the original correlation results together with the estimated correlation results are shown in a common diagram in FIG. 4. As shown in FIG. 4, the maximum attenuation for the method of the present invention is 1.15 dB, which is not much more than for the brute-force correlation computation performed at rate Tc/2 (0.94 dB there).

The use of a four-tap FIR estimation filter provides performance equivalent to that of the "brute force" method while yielding a reduction of the order of 50% of the hardware utilized to perform the "brute force" method.

Although a larger number of taps may be provided in the estimation FIR filter 26, the gained improvement in filter performance drops considerably with the inclusion of additional taps. An increase in the number of taps however, increases a delay through the filter as well as adding to the complexity of the filter. Thus, the total number of taps should preferably be four (4) but could still meaningfully be in a range of two (2) to twenty (20). A preferred range is two (2) to ten (10), while the most preferred range is two (2) to four (4).

There are several variants of this interpolation method of the present invention to optimize the performance versus the processing effort:

Vary the number of filter taps

Use more than just 1 estimation value spaced at Tc/2 away from true calculated values spaced at Tc from each other, (e.g. use 2 estimation values in between, spaced at Tc/3 and 2-tap filtering).

Figure 8:
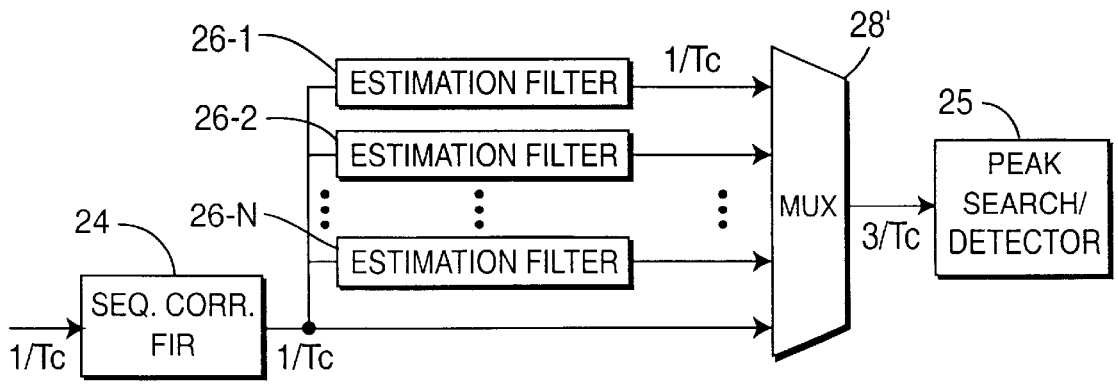
FIG. 8 is an alternative embodiment of the present invention.

FIG. 8 shows an arrangement wherein more than one estimation FIR filter is employed. For example, assuming that two estimation filters 26-1 and 26-2 are employed, their outputs, together with the output from sequence correlation FIR filter 24, are applied to multiplexer $28^1$, which differs from the multiplexer 28 shown in FIG. 7, in that the outputs from 26-1, 26-2 and 22 are fed in sequential fashion to the peak search detector 25 which operates at a rate of three times the sample rate. In the example given, the estimation FIR filters 26-1 and 26-2 may be two (2)-tap FIR estimation filters. If desired, a greater number of estimation filters 26 may be employed with the peak search/detector 24 operating at a rate of N+1 times the sample rate where N is equal to the number of estimation filters employed. It should be noted that the gained performance improvement employing a greater number of estimation filters likewise drops off quite considerably, the maximum number of estimation filters 26 should preferably not exceed four (4).

In summary, the present invention proposes using estimations for increasing the timing resolution of extremely processing-hungry correlations over the time domain, with very little extra processing compared to increasing the resolution in the original correlation.

What is claimed is:

1. Apparatus for correlating a signal having a known sequence to obtain synchronization, comprising:
   a sequence correlating finite impulse response (FIR) filter matched to the known sequence;
   an estimator finite impulse response (FIR) filter matched to the pulse before chip rate processing action on the original from that sequence correlating FIR filter; and
   a threshold detector acting on the signal from the estimation FIR filter for peak detection;
   wherein the threshold detector operates at twice a chip rate of the received signal.

2. Apparatus for correlating a signal having a known sequence to obtain synchronization, comprising:
   a sequence correlating finite impulse response (FIR) filter matched to the known sequence;
   an estimator finite impulse response (FIR) filter matched to the pulse before chip rate processing action on the original from that sequence correlating FIR filter; and
   a threshold detector acting on the signal from the estimation FIR filter for peak detection;
   wherein said estimator FIR filter comprises several matched filters connected to said sequence correlating filter.

3. A method for detecting a received signal having a known sequence and a given chip rate, comprising:
   a) passing the signal through a finite impulse response (FIR) filter for sequence correlation;
   b) passing the signal obtained at step (a) through n finite impulse response (FIR) estimation filters; and
   c) sequentially coupling the signals obtained at steps (a) and (b) to a peak search/detector operating at a rate of N+1 times the chip rate.

4. The method of claim 3 wherein,
   when n=1 step (b) includes providing a four (4) tap FIR filter.

5. The method of claim 3 wherein,
   when n=2, step (b) includes providing first and second two (2) tap FIR filters.

6. The method of claim 3 wherein step (b) comprises arranging the FIR filters to operate at the chip rate.

* * * * *

UNITED STATES PATENT AND TRADEMARK OFFICE
CERTIFICATE OF CORRECTION

PATENT NO. : 6,792,037 B2
DATED : September 14, 2004
INVENTOR(S) : Meyer et al.

It is certified that error appears in the above-identified patent and that said Letters Patent is hereby corrected as shown below:

Column 4,
Line 7, delete "a3" and insert -- $a_3$ --.

Signed and Sealed this

Eleventh Day of April, 2006

JON W. DUDAS
*Director of the United States Patent and Trademark Office*